(12) United States Patent
Nakajima

(10) Patent No.: US 7,162,255 B2
(45) Date of Patent: Jan. 9, 2007

(54) SYSTEM FOR PROVIDING NAME OF LOCATION AT WHICH CELLULAR PHONE TERMINAL UNIT IS LOCATED

(75) Inventor: Taketoshi Nakajima, Tokyo (JP)

(73) Assignee: NEC Corporation, Tokyo (JP)

( * ) Notice: Subject to any disclaimer, the term of this patent is extended or adjusted under 35 U.S.C. 154(b) by 861 days.

(21) Appl. No.: 09/942,921

(22) Filed: Aug. 31, 2001

(65) Prior Publication Data
US 2002/0032036 A1 Mar. 14, 2002

(30) Foreign Application Priority Data
Sep. 4, 2000 (JP) ............................. 2000-267117

(51) Int. Cl.
H04Q 7/20 (2006.01)
(52) U.S. Cl. .................................. 455/456.4; 342/457
(58) Field of Classification Search ............. 455/456.1, 455/445, 433, 406, 432, 446; 380/258, 259, 380/262; 370/335, 342
See application file for complete search history.

(56) References Cited

U.S. PATENT DOCUMENTS

| | | | |
|---|---|---|---|
| 5,654,719 A * | 8/1997 | Kunii ........................ | 342/451 |
| 5,930,699 A | 7/1999 | Bhatia ....................... | 455/414 |
| 5,940,761 A * | 8/1999 | Tiedemann et al. ......... | 455/437 |
| 6,230,018 B1 * | 5/2001 | Watters et al. ............ | 455/456.3 |
| 6,393,288 B1 * | 5/2002 | Sollee et al. ............... | 455/445 |
| 6,466,560 B1 * | 10/2002 | Lee et al. .................. | 370/335 |
| 6,671,377 B1 * | 12/2003 | Havinis et al. ............. | 380/258 |
| 6,741,582 B1 * | 5/2004 | Mansour ..................... | 370/342 |

FOREIGN PATENT DOCUMENTS

| | | |
|---|---|---|
| EP | 1 061 756 | 12/2000 |
| GB | 2 364 617 A | 1/2002 |
| GB | 2 365 279 A | 2/2002 |
| JP | 5-336035 | 12/1993 |
| JP | 6-205116 | 7/1994 |
| JP | 8-19034 | 1/1996 |
| JP | 8-289355 | 1/1996 |
| JP | 8-126060 | 5/1996 |
| JP | 9-37336 | 2/1997 |
| JP | 10-51840 | 2/1998 |
| JP | 10-094040 | 4/1998 |
| JP | 11-014732 | 1/1999 |
| JP | 2000-69540 | 3/2000 |

(Continued)

OTHER PUBLICATIONS

Japanese Office Action dated Dec. 3, 2003 with English translation of pertinent portions.

(Continued)

*Primary Examiner*—Gerald Gauthier
(74) *Attorney, Agent, or Firm*—Whitham, Curtis, Christofferson & Cook, P.C.

(57) ABSTRACT

A location name server is disclosed, that comprises a database for storing peripheral information and location names that have been correlated with each other as a plurality of sets, a means for transmitting a request for peripheral information to an objective cellular phone terminal unit when a request for the name of a location at which the object cellular phone terminal unit is located is received, a means for searching the database for the name of the location corresponding to peripheral information (i.e. electric field level) received from the objective cellular phone terminal unit corresponding to the request for the peripheral information, and a means for transmitting the obtained name of the location to a transmission source of the request therefor.

12 Claims, 4 Drawing Sheets

FOREIGN PATENT DOCUMENTS

| | | |
|---|---|---|
| JP | 2000-123296 | 4/2000 |
| WO | WO 98/59506 | 12/1998 |
| WO | WO 99/43173 | 2/1999 |
| WO | WO 01/08339 | 2/2001 |
| WO | WO 01/67790 | 9/2001 |

OTHER PUBLICATIONS

European counterpart Search Report from the EPO.

* cited by examiner

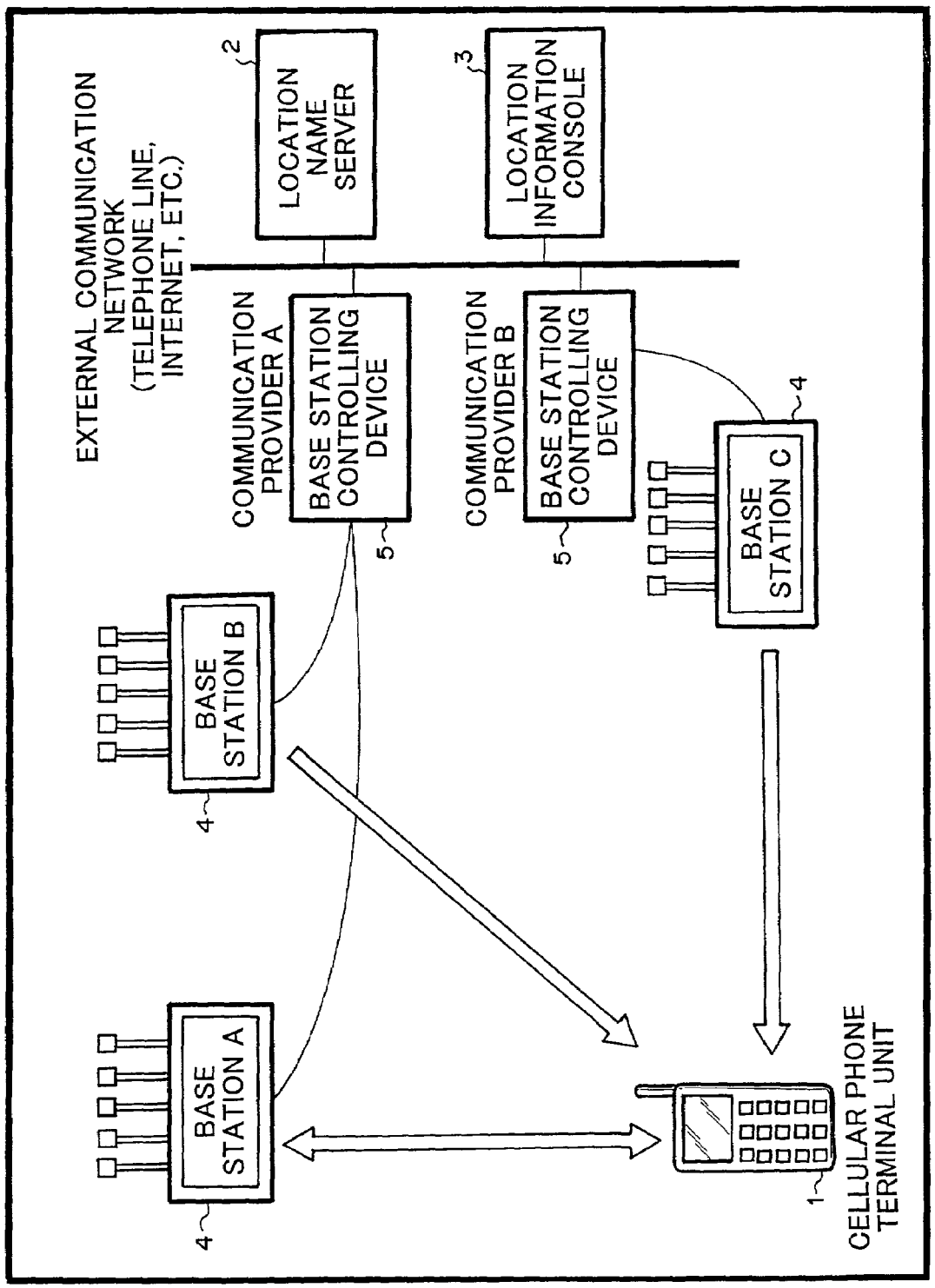

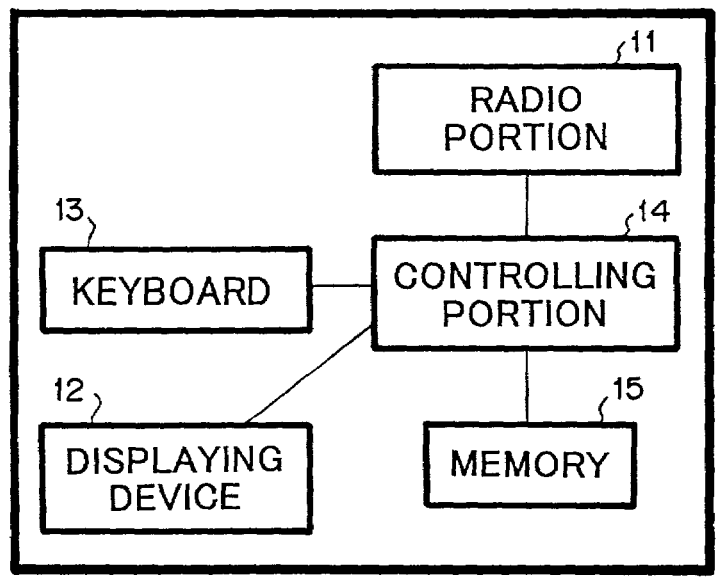
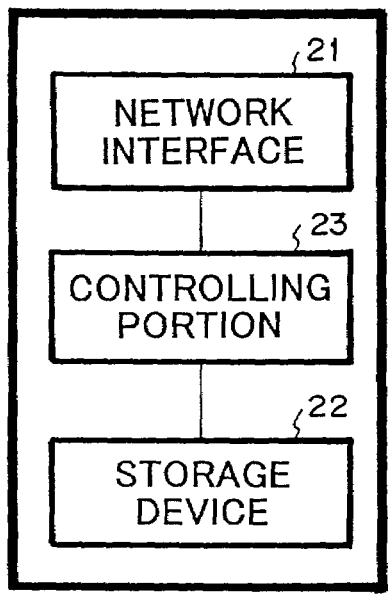
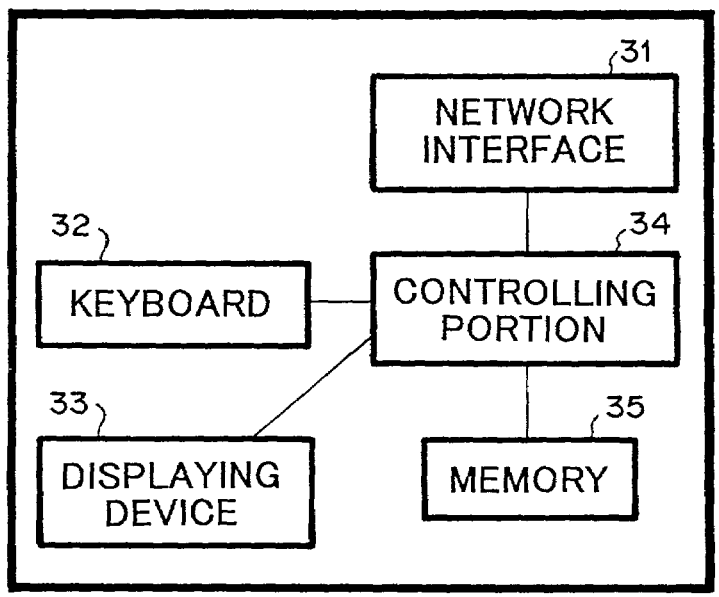

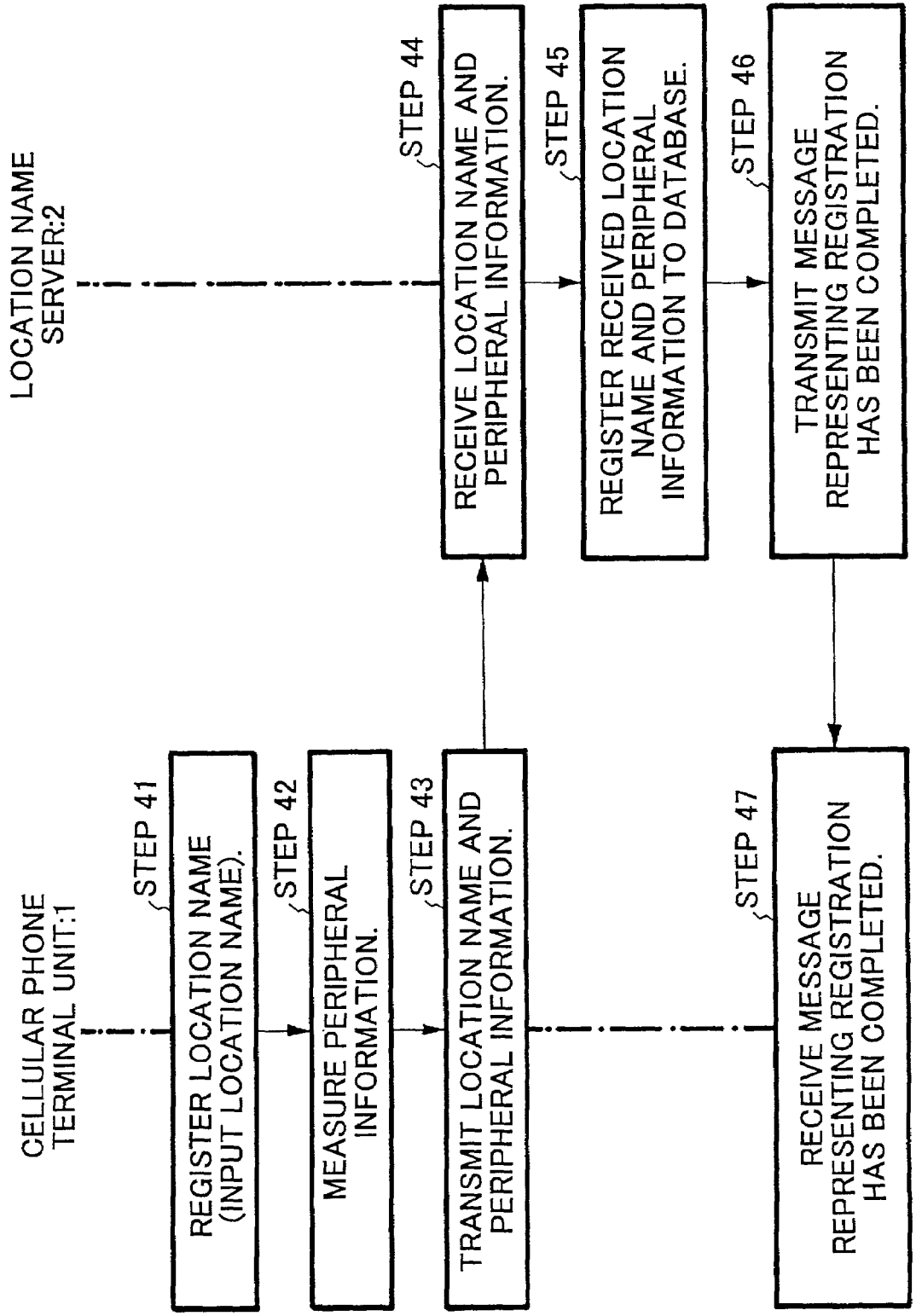

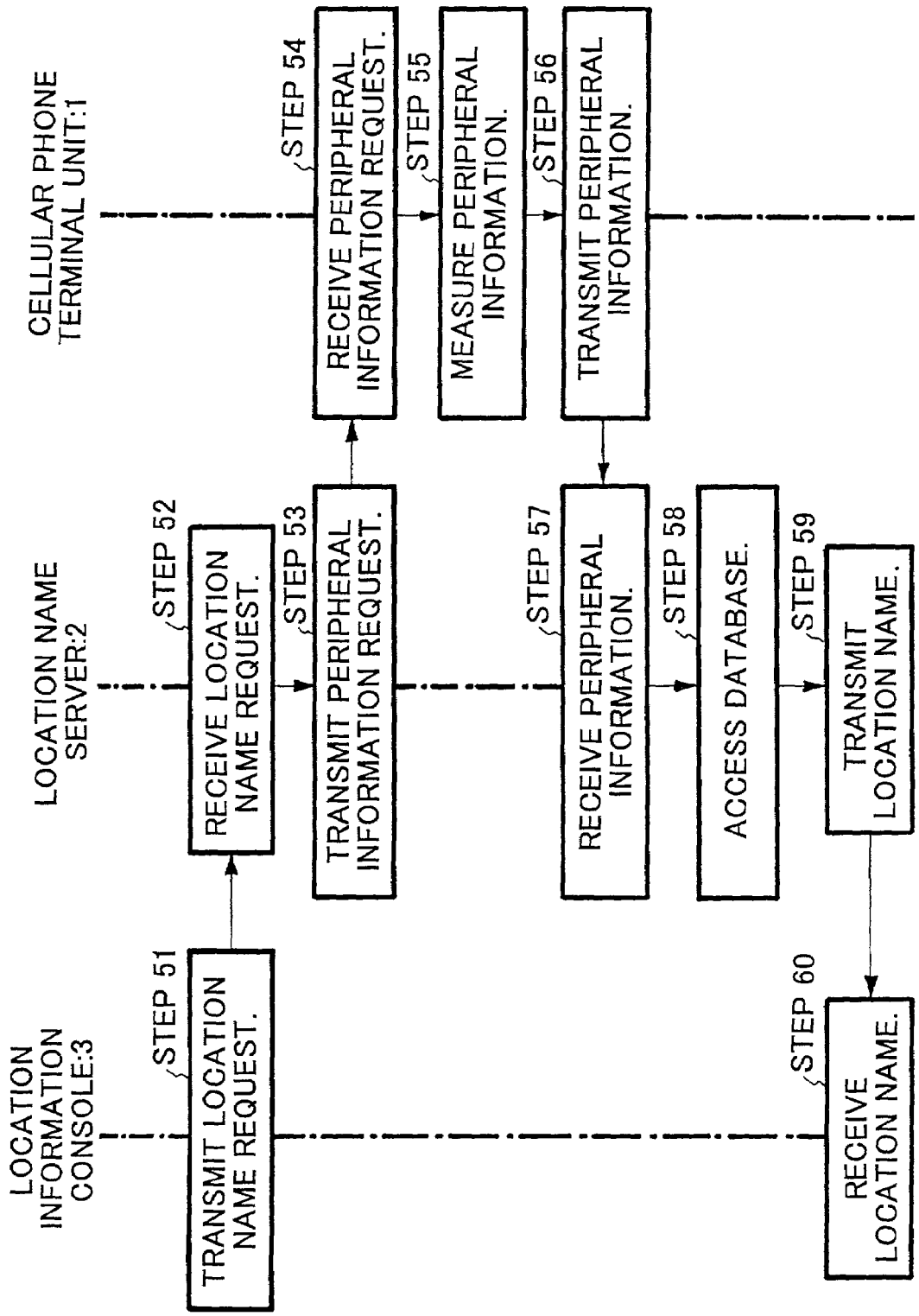

SYSTEM FOR PROVIDING NAME OF LOCATION AT WHICH CELLULAR PHONE TERMINAL UNIT IS LOCATED

BACKGROUND OF THE INVENTION

1. Field of the Invention

The present invention relates to a system for providing the name of a location at which a cellular phone terminal unit is located.

2. Description of the Prior Art

Presently, PHS (Personal Handy-phone System) providers provide location information services for PHS terminal units using base station codes whose locations have been registered.

On the other hand, in a cellular phone (e.g. PDC (Personal Digital Cellular) system based on ARIB RCR STD-27 (Association of Radio Industries and Businesses Research and development Center for Radio systems standard-27) and GSM (Global System for Mobile communication)), since the cell of each base station is relatively large, a location information service is not used. Thus, in a cellular phone system, a cellular phone unit needs be equipped with an expensive GPS (Global Positioning System) receiver in order to provide accurate location information.

SUMMARY OF THE INVENTION

An object of the present invention is to provide a system that allows the name of a location at which a cellular phone terminal unit is located to be provided at low cost.

A first aspect of the present invention is a first location name server, comprising a database for storing peripheral information and location names that have been correlated each other as a plurality of sets, a means for transmitting a request for peripheral information to an objective cellular phone terminal unit when a request for the name of a location at which the object cellular phone terminal unit is located is received, a means for searching the database for the name of the location corresponding to peripheral information received from the objective cellular phone terminal unit corresponding to the request for the peripheral information, and a means for transmitting the obtained name of the location to a transmission source of the request therefor.

A second aspect of the present invention is a second location name server of which the first location name server further comprises a means for receiving a set of peripheral information and a location name that have been correlated each other from a registering cellular phone terminal unit, and a means for registering the received set of peripheral information and a location name that have been correlated each other to the database.

A third aspect of the present invention is a first system for providing the name of a location at which a cellular phone terminal unit is located, comprising the first location name server, and the objective cellular phone terminal unit, comprising a means for obtaining the peripheral information, a means for receiving a request for the peripheral information from the location name server, and a means for transmitting the peripheral information to the location name server when the request for the peripheral information is received from the location name server.

A fourth aspect of the present invention is a second system of which the first system further comprises a location information console, comprising a means for transmitting the request for the name of the location at which the objective cellular phone terminal unit is located to the location name server, a means for receiving the obtained name of the location from the location name server, and a means for displaying the received name of the location.

A fifth aspect of the present invention is a third system for providing the name of a location at which a cellular phone terminal unit is located, comprising the second location name server and the registering cellular phone terminal unit, comprising a means for obtaining peripheral information, a means for obtaining the name of a location, a means for correlating the obtained peripheral information and the obtained name of the location, and a means for transmitting a set of the peripheral information and the name of the location that have been correlated to the location name server.

A sixth aspect of the present invention is a third location name server, comprising a database for storing peripheral information and location names that have been correlated each other as a plurality of sets, a means for receiving a request for the name of a location as a request containing peripheral information, a means for searching the database for the name of the location corresponding to the peripheral information contained in the request for the name of the location, and a means for transmitting the obtained name of the location to a transmission destination for the request of the name of the location.

A seventh aspect of the present invention is a fourth location name server of which the third location name server further comprises a means for receiving a set of peripheral information and a location name that have been correlated each other from a registering cellular phone terminal unit, and a means for registering the received set of peripheral information and a location name that have been correlated each other to the database.

An eighth aspect of the present invention is a fourth system for providing the name of a location at which a cellular phone terminal unit is located, comprising the third location name server and an objective cellular phone terminal unit, comprising a means for obtaining peripheral information, a means for transmitting a request for the name of a location as a request containing peripheral information to the location name server, and a means for receiving the obtained name of a location from the location name server.

A ninth aspect of the present invention is a fifth system of which the fourth system further comprises a location information console, comprising a means for transmitting a request for the name of a location at which the cellular phone terminal unit is located as a request that does not contain peripheral information, a means for receiving the obtained name of the location from the cellular phone terminal unit, and a means for displaying the received name of the location.

A tenth aspect of the present invention is a fifth system for providing the name of a location at which a cellular phone terminal unit is located, comprising the fourth location name server and the registering cellular phone terminal unit, comprising a means for obtaining peripheral information, a means for obtaining the name of a location, a means for correlating the obtained peripheral information and the obtained name of the location, and a means for transmitting a set of the peripheral information and the name of the location that have been correlated each other to the location name server.

These and other objects, features and advantages of the present invention will become more apparent in light of the following detailed description of a best mode embodiment thereof, as illustrated in the accompanying drawings.

BRIEF DESCRIPTION OF DRAWINGS

FIG. 1 is a conceptual schematic diagram showing the structure of a system for providing the name of a location at which a cellular phone terminal unit is located (this system may be sometimes referred to as location name providing system) according to an embodiment of the present invention;

FIG. 2 is a block diagram showing the structure of the cellular phone terminal unit shown in FIG. 1;

FIG. 3 is a block diagram showing the structure of a location name server shown in FIG. 1;

FIG. 4 is a block diagram showing the structure of a location information console shown in FIG. 1;

FIG. 5 is a sequence diagram for explaining a location name registering operation of the location name providing system according to an embodiment of the present invention; and FIG. 6 is a sequence diagram for explaining a location name informing operation of the location name providing system according to the embodiment of the present invention.

DESCRIPTION OF PREFERRED EMBODIMENT

The present invention is a cellular phone terminal unit and cellular phone system that correlate peripheral information (report information and electric field level) that the cellular phone terminal unit measures and a location name (a location name such as OO railway station) that the user inputs. Such unit and system provide a location information service corresponding to the correlated information at low cost.

FIG. 1 shows the overall structure of the system according to an embodiment of the present invention. In FIG. 1, the system comprises a cellular phone terminal unit 1, a location name server 2, and a location information console 3. In the system, the location of the cellular phone terminal unit 1 is obtained. The location name server 2 compares the peripheral information of the cellular phone terminal unit that has been registered, with a location name that has been registered. The location information console 3 retrieves the location name of the cellular phone terminal unit. The cellular phone terminal unit 1, the location name server 2, and the location information console 3 are connected to the infrastructure of the conventional cellular phone system. The infrastructure of the cellular phone system of each communication provider has a base station 4 and a base station controlling device 5. The base station 4 communicates with the cellular phone terminal unit 1 with a radio wave. The base station controlling device 5 controls the base station 4 and communicates with an external communication network. The external communication network is for example a telephone network, the Internet, or the like.

In this example, it is assumed that the cellular phone terminal unit 1 has been registered with base station A. In addition, it is assumed that the cellular phone terminal unit 1 can receive radio waves transmitted from base station B and base station C. Moreover, it is assumed that base station A and base station B belong to communication provider A and that base station C belongs to communication provider B.

FIG. 2 is a schematic diagram showing the structure of the cellular phone terminal unit 1 according to the present invention. The cellular phone terminal unit 1 comprises a radio portion 11, a displaying device 12, a keyboard 13, a controlling portion 14, and a memory 15. The radio portion 11 communicates with a base station with a radio wave. The displaying device 12 is for example an LCD (Liquid Crystal Display) that displays information for the user. The keyboard 13 serves for inputting a user's command. The controlling portion 14 controls the radio portion 11, the displaying device 12, and the keyboard 13. The memory 15 stores information used by the controlling portion 14.

FIG. 3 is a schematic diagram showing the structure of the location name server 2. The location name server 2 comprises a network interface 21, a storage device 22, and a controlling portion 23. The network interface 21 communicates with an external communication network. The storage device 22 is for example a magnetic storage device, a memory, and so forth that store data of a location name and peripheral information transmitted from a cellular phone terminal unit. The controlling portion 23 controls the network interface 21 and the storage device 22.

FIG. 4 is a schematic diagram showing the structure of the location information console 3 according to the present invention. The location information console 3 comprises a network interface 31, a keyboard 32, a displaying device 33, a controlling portion 34, and a memory 35. The network interface 31 communicates with an external communication network. The keyboard 32 serves for inputting a user's command. The displaying device 33 is for example a CRT (Cathode Ray Tube) that displays information for the user. The controlling portion 34 controls the network interface 31, the keyboard 32, and the displaying device 33. The memory 35 stores information used in the controlling portion 34.

Next, with reference to FIGS. 5 and 6, the operation of the present invention will be described. FIG. 5 is a flow chart showing an operation in which the user of the cellular phone terminal unit 1 registers a location name with the location name server 2. FIG. 6 is a flow chart showing an operation in which the user of the location information service searches for the location of the cellular phone terminal unit 1.

Referring to FIG. 5, at step 41, the user of the cellular phone terminal unit 1 registers "location name" (for example OO station, OO intersection, or the like) as the name of a location at which the cellular phone terminal unit 1 is located with the memory 15 using the keyboard 13 and the displaying device 12. At step 42, the cellular phone terminal unit 1 measures peripheral information thereof. In this example, the peripheral information is report information (system information) and electric field intensity (RSSI) of base station A, base station B, and base station C from which the cellular phone terminal unit 1 receives radio waves. The report information that identifies a base station is a combination of a communication frequency and color code that the base station uses. In this example, base station C is a base station that belongs to a non-subscription communication provider. However, report information of base station C can be received and the electric field intensity thereof can be measured. At step 43, the cellular phone terminal unit 1 transmits data of "location name" obtained at step 41 and "peripheral information" obtained at step 42 to the location name server 2 through base station A.

At step 44, the network interface 21 of the location name server 2 receives data transmitted from the cellular phone terminal unit 1 at step 43. At step 45, the location name server 2 registers the received data with a database of the storage device 22. At step 46, the location name server 2 transmits a message representing that the data has been registered, to the cellular phone terminal unit 1. At step 47, the cellular phone terminal unit 1 knows that the data has been received and informs the user thereof.

Next, with reference to FIG. 6, the location information obtaining operation of the location information console 3 operated by the user who uses the location information service will be described. At step 51, the user of the location information service causes the location information console 3 to transmit a location name request containing the telephone number of an objective cellular phone terminal unit 1 to the location name server 2. At step 52, the location name server 2 receives the location name request. At step 53, the location name server 2 makes a connection to the cellular phone terminal unit 1 corresponding to information of the telephone number and so forth contained in the location name request and transmits a peripheral information request to the cellular phone terminal unit 1. At step 54, the cellular phone terminal unit 1 receives the peripheral information request. At step 55, the cellular phone terminal unit 1 measures the peripheral information thereof in the same manner as step 42. At step 56, the cellular phone terminal unit 1 transmits the peripheral information obtained at step 55 to the location name server 2. At step 57, the location name server 2 receives the peripheral information from the cellular phone terminal unit 1. At step 58, the location name server 2 compares the received peripheral information with all peripheral information stored in the database and obtains a location name that is correlated with peripheral information that is the closest to the received peripheral information from the database. At step 59, the location name server 2 transmits the location name obtained at step 58 to the location information console 3. At step 60, the location information console 3 receives the location name from the location name server 2 and displays the received location name on the displaying device 33 for the user of the location information service.

According to another embodiment of the present invention, the location information console 3 transmits a location name request to the cellular phone terminal unit 1. The cellular phone terminal unit 1 obtains peripheral information thereof corresponding to the location name request. Thereafter, the cellular phone terminal unit 1 transmits a location name search request containing the obtained peripheral information to the location name server 2. The location name server 2 searches the location name corresponding to the peripheral information transmitted from the cellular phone terminal unit 1 and transmits the obtained location name to the cellular phone terminal unit 1. The cellular phone terminal unit 1 transmits the location name received from the location name server 2 to the location information console 3.

According to a further embodiment of the present invention, a cellular phone terminal unit has a function of a PHS terminal unit. That is, the cellular phone terminal unit is a hybrid terminal that functions as a cellular phone and as a PHS terminal. In this case, peripheral information measured by the PHS terminal unit function portion can be used as the above-described peripheral information. Thus, even if the user of the cellular phone terminal unit having the PHS terminal unit function has contracted a cellular phone company for only the cellular phone terminal unit and not for PHS terminal, he or she can obtain the location name.

According to another embodiment of the present invention, a cellular phone terminal unit may have a function of a location name server.

According to another embodiment of the present invention, a cellular phone terminal unit may have a function of a location information console.

According to another embodiment of the present invention, the cellular phone terminal unit 1 periodically measures peripheral information thereof and stores the measured peripheral information to the memory 15. Corresponding to one peripheral information request (at steps 53 and 54), the cellular phone terminal unit 1 transmits a plurality of records of peripheral information stored in the memory 15 to the location name server (at steps 56 an 57). As a result, the user can know the history of locations where the cellular phone terminal unit 1 has been.

As was described above, according to the present invention, the following effects can be obtained.

According to the present invention, based on the infrastructure of the conventional cellular phone system, a location information service can be accomplished at low cost with a cellular phone terminal unit, a location name server, and a location information console.

As a method for obtaining location information, using peripheral electric field and so forth, the location of a cellular phone terminal unit can be more accurately obtained than the radius of a cell. Thus, the location name can be more accurately obtained than the conventional location information service based on a location registration to a cell.

Since report information and electric field information of base stations that belong to communication providers with which a user has no contract of subscription can be used, a location information service can be accomplished with higher accuracy than before.

Since a proper name (for example, OO company, OO station, etc.) as a location name is registered, information can be conveniently provided to the user.

When the location name server stores "peripheral information" and "location name" registered by a plurality of cellular phone terminal units, the user can obtain the location name of an unknown location.

Since a conventional location information service using base station code, registered location information, and GPS measured data is not required, the service according to the present invention can be used even in a roaming service area.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A location name server, comprising:
   a database for storing peripheral information and location names that have been correlated each other as a plurality of sets;
   means for transmitting to an objective cellular phone terminal unit a request for peripheral information when a location request is received for a name of a location of the object cellular phone terminal unit;
   means for searching the database for the name of the location corresponding to peripheral information received from the objective cellular phone terminal unit corresponding to the request for the peripheral information; and
   means for transmitting the name of the location to a transmission source of the location request; and
   wherein the peripheral information comprises report information that identifies a base station and electric field information measured by the cellular phone terminal unit.

2. The location name server as set forth in claim 1, further comprising:

means for receiving from a registering cellular phone terminal unit a set of peripheral information and a location name that have been correlated with each other; and means for registering to the database the received set of peripheral information and a location name that have been correlated with each other.

3. The location name server of claim 1 wherein the report information comprises communication frequency and color code of a base station.

4. A system for providing the name of a location at which a cellular phone terminal unit is located, comprising:
   a location name server comprising:
      a database for storing peripheral information and location names that have been correlated with each other as a plurality of sets;
      means for transmitting to an objective cellular phone terminal unit a request for peripheral information when a location request is received for a name of a location of the object cellular phone terminal unit;
      means for searching the database for the name of the location corresponding to peripheral information received from the objective cellular phone terminal unit corresponding to the request for the peripheral information; and
      means for transmitting the name of the location to a transmission source of the location request; and
      wherein the peripheral information comprises report information that identifies a base station and electric field information measured by the cellular phone terminal unit; and
   an objective cellular phone terminal unit, wherein the objective cellular phone terminal unit comprises:
      means for obtaining the peripheral information;
      means for receiving from said location name server the request for the peripheral information; and
      means for transmitting the peripheral information to said location name server when the request for the peripheral information is received from said location name server.

5. The system as set forth in claim 4, further comprising:
   a location information console, comprising:
   means for transmitting to said location name server the location request for the name of the location of the objective cellular phone terminal unit;
   means for receiving the name of the location from said location name server; and
   means for displaying the received name of the location.

6. A system for providing the name of a location at which a cellular phone terminal unit is located, comprising:
   a location name server comprising:
      a database for storing peripheral information and location names that have been correlated with each other as a plurality of sets;
      means for transmitting to an objective cellular phone terminal unit a request for peripheral information when a location request is received for a name of a location of the object cellular phone terminal unit;
      means for searching the database for the name of the location corresponding to peripheral information received from the objective cellular phone terminal unit corresponding to the request for the peripheral information; and
      means for transmitting the name of the location to a transmission source of the location request,
      wherein the peripheral information comprises report information that identifies a base station and electric field information measured by the cellular phone terminal unit;
   means for receiving from a registering cellular phone terminal unit a set of peripheral information and a location name that have been correlated with each other; and
   means for registering to the database the received set of peripheral information and a location name that have been correlated with each other; and
   a registering cellular phone terminal unit, wherein said registration cellular phone terminal unit comprises:
      means for obtaining peripheral information; means for obtaining the name of a location;
      means for correlating the obtained peripheral information and the obtained name of the location; and
      means for transmitting to said location name server a set of the peripheral information and the name of the location that have been correlated with each other.

7. A location name server, comprising:
   a database for storing peripheral information and location names that have been correlated with each other as a plurality of sets;
   means for receiving a location request for a name of a location as a request containing peripheral information;
   means for searching said database for the name of the location corresponding to the peripheral information contained in the location request for the name of the location; and
   means for transmitting the obtained name of the location to a transmission source for the location request; and
   wherein the peripheral information comprises report information that identifies a base station and electric field information measured by the cellular phone terminal unit.

8. The location name server as set forth in claim 7, further comprising:
   means for receiving from a registering cellular phone terminal unit a set of peripheral information and a location name that have been correlated with each other; and
   means for registering to the database the received set of peripheral information and a location name that have been correlated with each other.

9. The location name server of claim 7 wherein the report information comprises communication frequency and color code of a base station.

10. A system for providing the name of a location at which a cellular phone terminal unit is located, comprising:
    a location name server comprising:
       a database for storing peripheral information and location names that have been correlated with each other as a plurality of sets;
       means for receiving a location request for a name of a location as a request containing peripheral information;
       means for searching said database for the name of the location corresponding to the peripheral information contained in the location request for the name of the location; and
       means for transmitting the obtained name of the location to a transmission source for the location request, and wherein the peripheral information comprises report information that identifies a base station and electric field information measured by the cellular phone terminal unit; and an objective cellular phone terminal unit, wherein said objective cellular phone terminal unit comprises:

means for obtaining peripheral information;

means for transmitting to said location name server a location request for the name of a location as a request containing peripheral information; and means for receiving the name of a location from said location name server.

11. The system as set forth in claim 10, further comprising:

a location information console, comprising:

means for transmitting to said cellular phone terminal unit a location request for the name of a location of said cellular phone terminal unit as a request that does not contain peripheral information;

means for receiving the obtained name of the location from said cellular phone terminal unit; and means for displaying the received name of the location.

12. A system for providing the name of a location at which a cellular phone terminal unit is located, comprising:

a location name server comprising:

a database for storing peripheral information and location names that have been correlated with each other as a plurality of sets;

means for receiving a location request for a name of a location as a request containing peripheral information;

means for searching said database for the name of the location corresponding to the peripheral information contained in the location request for the name of the location; and means for transmitting the obtained name of the location to a transmission source for the location request, and wherein the peripheral information comprises report information that identifies a base station and electric field information measured by the cellular phone terminal unit;

means for receiving from a registering cellular phone terminal unit a set of peripheral information and a location name that have been correlated with each other;

means for registering to the database the received set of peripheral information and a location name that have been correlated with each other; and a registering cellular phone terminal unit, wherein the registering cellular phone terminal unit comprises:

means for obtaining peripheral information; means for obtaining the name of a location;

means for correlating the obtained peripheral information and the obtained name of the location; and means for transmitting to said location name server a set of the peripheral information and the name of the location that have been correlated with each other.

\* \* \* \* \*